United States Patent
Drummond-Murray et al.

(10) Patent No.: US 6,762,995 B1
(45) Date of Patent: Jul. 13, 2004

(54) NETWORK SWITCH INCLUDING HYSTERESIS IN SIGNALLING FULLNESS OF TRANSMIT QUEUES

(75) Inventors: Justin A Drummond-Murray, Chorleywood (GB); David J Law, Kempston (GB); Daniel M O'Keeffe, Ballyhooly (IE); Robin Parry, Watford (GB)

(73) Assignee: 3Com Corporation, Santa Clara, CA (US)

( * ) Notice: Subject to any disclaimer, the term of this patent is extended or adjusted under 35 U.S.C. 154(b) by 800 days.

(21) Appl. No.: 09/593,506

(22) Filed: Jun. 14, 2000

(30) Foreign Application Priority Data

Mar. 11, 2000 (GB) .............................................. 0005853

(51) Int. Cl.[7] .............................................. H04L 12/56
(52) U.S. Cl. .................. 370/229; 370/395.71; 370/414; 370/413
(58) Field of Search ................................. 370/229, 230, 370/231, 235, 236, 401, 412, 413, 414, 428, 429, 415, 395.71

(56) References Cited

U.S. PATENT DOCUMENTS

| | | | | |
|---|---|---|---|---|
| 5,426,640 A | * | 6/1995 | Hluchyj et al. | 370/235 |
| 5,822,300 A | * | 10/1998 | Johnson et al. | 370/229 |
| 5,920,568 A | | 7/1999 | Kurita et al. | |
| 6,134,218 A | * | 10/2000 | Holden | 370/232 |
| 6,167,054 A | * | 12/2000 | Simmons et al. | 370/422 |
| 6,192,028 B1 | * | 2/2001 | Simmons et al. | 370/229 |
| 6,222,825 B1 | * | 4/2001 | Mangin et al. | 370/235 |
| 6,252,849 B1 | * | 6/2001 | Rom et al. | 370/230 |
| 6,405,258 B1 | * | 6/2002 | Erimli et al. | 709/235 |

* cited by examiner

Primary Examiner—Wellington Chin
Assistant Examiner—Mark A Mais
(74) Attorney, Agent, or Firm—Nixon & Vanderhye P.C.

(57) ABSTRACT

A multiport network device includes a multiplicity of receive queues, a multiplicity of transmit queues and a forwarding engine for transferring entries from the receive queues to the transmit queues. When a transmit queue is greater than a first hysteresis point, the forwarding engine prevents transfer of entries from a receive queue to the transmit queue and transfer of entries to the transmit queue is allowed when the length of the transmit queue falls below a second hysteresis point.

6 Claims, 5 Drawing Sheets

NETWORK SWITCH INCLUDING HYSTERESIS IN SIGNALLING FULLNESS OF TRANSMIT QUEUES

FIELD OF THE INVENTION

The present invention relates to network switches for packet-based communication systems such as Ethernet networks and to an improved method of operating such a network switch. The term 'switch' is intended to refer broadly to a device which receives addressed data packets and which can internally switch those packets in response to that address data or modified forms of such data. The invention is intended to be applicable to a variety of different switch architectures, as indicated hereinafter.

BACKGROUND TO THE INVENTION (a) Traffic Queues

It is well known to form traffic queues of data packets in network switches. Their formation is necessary to provide temporal buffering of a packet between the time it is received at a network switch and the time at which it can be transmitted from the switch. In most forms of network switch, the switch has a multiplicity of ports, and data packets received at the ports may after appropriate processing including look-ups in relation to destination and source addresses in the packets, be directed to a port or ports in accordance with that address data. Switches employing both media access control addresses (such as in bridges) or network addresses (such as in routers) are of course well known in the art. In such switches it is customary to provide temporal buffering both when the packets are received, in what are known as 'receive queues', and when they are assigned to transmit ports, in what are known as 'transmit queues'. In general, the transmission of packets from a transmit queue may depend on a variety of considerations, including possible congestion in a device to which the respective port is connected.

It is known to form queues of data packets in a variety of ways, including comparatively simple FIFOs established in hardware. More usually in modern switches queues may be formed in random access memory employing read and write pointers under the control of a memory controller. If static random access memory is employed, a particular traffic queue may be allotted a defined memory space and packets may be read in to that memory space under the control of a read pointer which progresses from one location to another until it reaches the 'end' of the allotted memory space whereupon it recycles to the beginning of the memory space (on the assumption that the space is not fully occupied). A read pointer progresses through the memory space in a similar manner. In such systems the fullness of a memory space or thresholds representing some fraction of fullness need to be expressed in terms of the effective distance in terms of memory locations between the read and write pointers.

Another system is a dynamic memory comprising a plurality of identifiable buffers which can be allotted to a specific traffic queue under the control of a Free Pool Controller and Transmit (Tx) Pointer Manager, termed for convenience herein 'memory controller'. In such a system, any particular traffic queue may have initially some small number, such as two, buffers allotted to it. If a queue requires more traffic space, then the memory controller can allot additional buffers to the queue. It is, as indicated for the previous example, possible to limit the available memory space by a limitation on the number of buffers employed for any particular queue, though it is known, and preferable in a variety of circumstances, to allow some traffic queues more space than others by imposing a different limit on the maximum number of buffers which can be used for that queue. In buffer systems, data may written into the buffers using a write pointer and read out from the relevant buffers using a read pointer. In general, the size of each buffer is substantially more than that of a single packet. Packets are normally stored in such buffers in the form of a status word (which would normally be read first), including some control data and also an indication of the size of the packet, followed by address data and message data. An interface which reads a packet from such a buffer store will, in a reading cycle, commence reading the status word and proceed to read the packet until the next status word is reached.

It is also possible, and preferred in the specific embodiment of this invention, to form a traffic queue indirectly, that is to say not by the packets that are in the queue but by respective pointers each of which points to a location containing the respective packet in the relevant memory space. In a scheme such as this, the receive and transmit queues are constituted by lists of pointers in respective memory space. The length of each queue may simply be determined by the number of entries (i.e. pointers) in the respective queue. When a pointer reaches the 'top' or 'front' of the queue, then, assuming the conditions for forwarding the respective packet have been met the pointer is employed by the switching engine to retrieve the respective packet from the relevant memory location.

(b) Transfer of Packets Across a Switch

There exists a variety of mechanisms and architectures for determining how a packet should be forwarded across a switch and in particular from a 'receive' queue to a 'transmit queue'. Basically, they all have in common a look-up process by means of which the destination of a packet, for example defined by a destination media access control address, is determined with the aid of a forwarding database that yields on the discovery of a match between the destination of the packet and an entry in the database forwarding data which determines the port or (in the case of a multicast packet) a multiplicity of ports from which the packet has to be forwarded. The compilation and organisation of forwarding databases and the use of ancillary features such as link tables, port masks and such like is too well known to warrant further description here.

(c) Discard of Packets within a Switch

It is a frequently occurring phenomenon in data communication networks that owing to variations in loading or data transmission rates and other circumstances the rate at which packets (or their pointers) are written to a transmit queue is greater than the rate at which packets (or their pointers) are removed from the queue by virtue of the forwarding of the packets from the respective port. For example, a device at the other end of a link to which the port is connected may itself be congested and, for example, may exert 'flow control', a term conventionally used to denote the sending of a control frame that prescribes a pause in the forwarding of packets from that port over the link for some time specified in the control frame. In any event, in any physical switch the memory space which can be allotted to a transmit queue is necessarily limited and there is always the possibility that the transmit queue becomes full. 'Fullness' is normally indicated when the length of the queue exceeds some predetermined value, called herein 'high watermark'. The high watermark may correspond to the maximum physical capacity allotted to the transmit queue though that is not essential, it is within the scope of the present invention for the high watermark to define some predetermined length which is less than the maximum physical capacity allotted to the queue.

It is customary when a transmit queue is 'full', however in practice this may be defined, for a look-up arbiter forming part of the forwarding engine not to forward a packet at the head of a receive queue to the transmit queue for which that packet is destined, instead the look-up arbiter causes discard of the packet. One reason for doing this, apart from the fact that the transmit queue can no longer accept any fresh packet, is to avoid 'head of line blocking'. It will be understood that if a packet which is at the head of a receive queue and intended for a particular transmit queue cannot be forwarded to that transmit queue, then packets subsequent to that packet at the head of the same receive queue can be blocked even though they may be intended for ports other than the port of which the traffic queue is full.

(d) Capture effect

Whether 'discard on full' is implemented in a switch or not, a multi-port switch is susceptible to what is known as a 'capture effect' arising from the fact that some ports are more likely to direct packets to a particular transmit queue than other ports. This is particularly apparent when some ports of a switch are coupled to low speed links whereas other ports are coupled to higher speed links.

Once a transmit queue is full it takes, in general, the same length of time to forward a packet of a given size as it takes to receive a packet of the same size. Thus in a switch where all the ports are asynchronous the last port to provide a packet to a transmit queue and thus fill it may be requesting the forwarding of a new packet to that port when the transmit port has transmitted its packet. Thus the most likely packet to be placed on the transmit queue is a packet pending from the port that previously provided a packet to the transmit port.

If the 'discard on full' mode is in operation, all other ports that have, in their receive queues, packets for a transmit port of which the queue is full will discard the 'head' packet because the transmit queue would still be full when transfer of the packet from their respective receive queue to the (full) transmit queue should occur. As soon as the transmit queue has taken one packet then all subsequent requests would be ignored because the transmit queue is now full again.

It is possible to employ 'round robin' systems wherein an interface which services transmit queues, that is to say organises the transfer across a switch of packets from receive queues to transmit queues is so arranged that a transmit queue can except packets only in turn from the various receive queues in a cyclic or 'round robin' sequence. However, such a system, particularly for a large number of ports, tends to be both complex and inflexible.

SUMMARY OF THE INVENTION

The present invention is based on the provision of hysteresis in the production of a signal which denotes that a transmit queue is full. More particularly, a transmit queue 'full' flag is set when the queue is full (i.e., it is greater than the size denoted by the high watermark) but is not 'released' until the transmit queue can accept a multiplicity of packets, this multiplicity being preferably at least equal to at least one packet for each of the ports that can provide packets for the respective transmit queue. Thus when the 'full' flag is released every port with a pending request for transfer of a packet from its respective receive queue to the previously full transmit queue can now be serviced.

It is therefore convenient to define, in accordance with the invention, a low watermark that corresponds to a length of transmit queue shorter than the length associated with the high watermark by the aforementioned multiplicity of packets. The low watermark will be of significance until the 'full' flag for the queue is asserted, thereafter the full flag will only be released when the transmit queue has diminished to below the low watermark.

DETAILED DESCRIPTION

Figure 1:
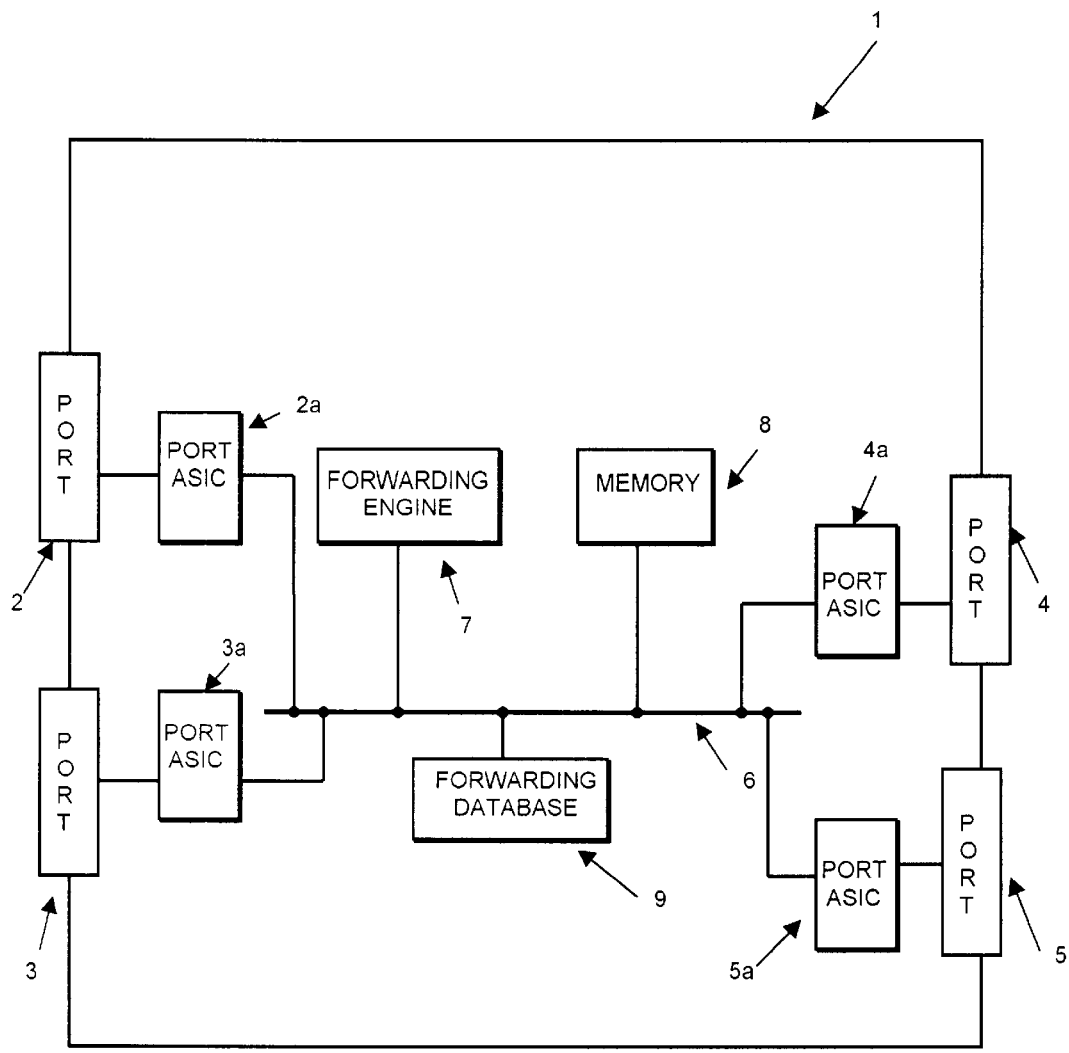
FIG. 1 illustrates in schematic form one example of a switch architecture in which the present invention may be embodied.

Although the specific construction of a switch is not necessarily an important feature of the invention, provided that the switch has both the storage ability and the processing ability that the invention requires. FIG. 1 is intended to show schematically the basic components of a switch that is suitable for use in the present invention. Typically, switches have twelve or twenty-four ports or even more. For the sake of simplicity, the switch 1 shown in FIG. 1 has only four ports, identified as ports 2, 3, 4 and 5.

If, as is preferred, the switch 1 is primarily a hardware switch, the various components within the switch 1, apart from most of the memory, may be provided on a single ASIC (application specific integrated circuit). However, for ease of explanation, the various components of the switch are separately shown in FIG. 1. In this example therefore, each of the ports 2, 3, 4 and 5 has a respective 'port ASIC', 2a, 3a, 4a and 5a. These components include the media access control devices (MACs) which perform (known) operations on packets entering and leaving the switch while the packets are in a format independent of the particular transmission medium to which a respective port is connected. The port ASICs also include a 'physical layer device' which not only converts packets from a media independent format to a format appropriate for the particular transmission medium but also includes various other functions such as for example auto-negotiation, particularly in the case of 'Ethernet' networks conforming to IEEE Standard 802.3.

The switch 1 includes a bus system 6 by means of which packet data and control and status data are conveyed between the various components of the switch. The switch includes a forwarding engine 7, the operation of which will be described later, a memory 8 which may be employed for the temporary storage of packets in 'queues' before they are sent to their destination ports, and a forwarding database 9. The forwarding engine will retrieve packets temporarily stored in memory 8 and direct them to respective ports in accordance with, for example, a port mask obtained from a relevant entry in the forwarding database 9.

Figure 2:
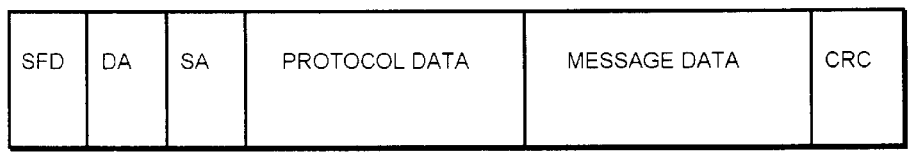
FIG. 2 illustrates schematically one form of packet which may be handled by a switch in accordance with the invention.

FIG. 2 illustrates in simplified schematic form a typical packet employed for the conveyance of data in a packet-based data communication system in which a switch such as switch 1 may form part. The packet comprises a start-of-frame delimiter (SFD), media access control address information, comprising a destination address (DA) and a source address (SA), protocol data, message data and cyclic redundancy check data (CRC). The media access control addresses define, if they are present, the source and destination devices in one 'hop' of a packet. The protocol data includes network address data defining, for example, the network to which the ultimate destination of the packet belongs and usually also an identification of a device within that network. The message data need not be present, as in the case of a control frame.

Figure 3:
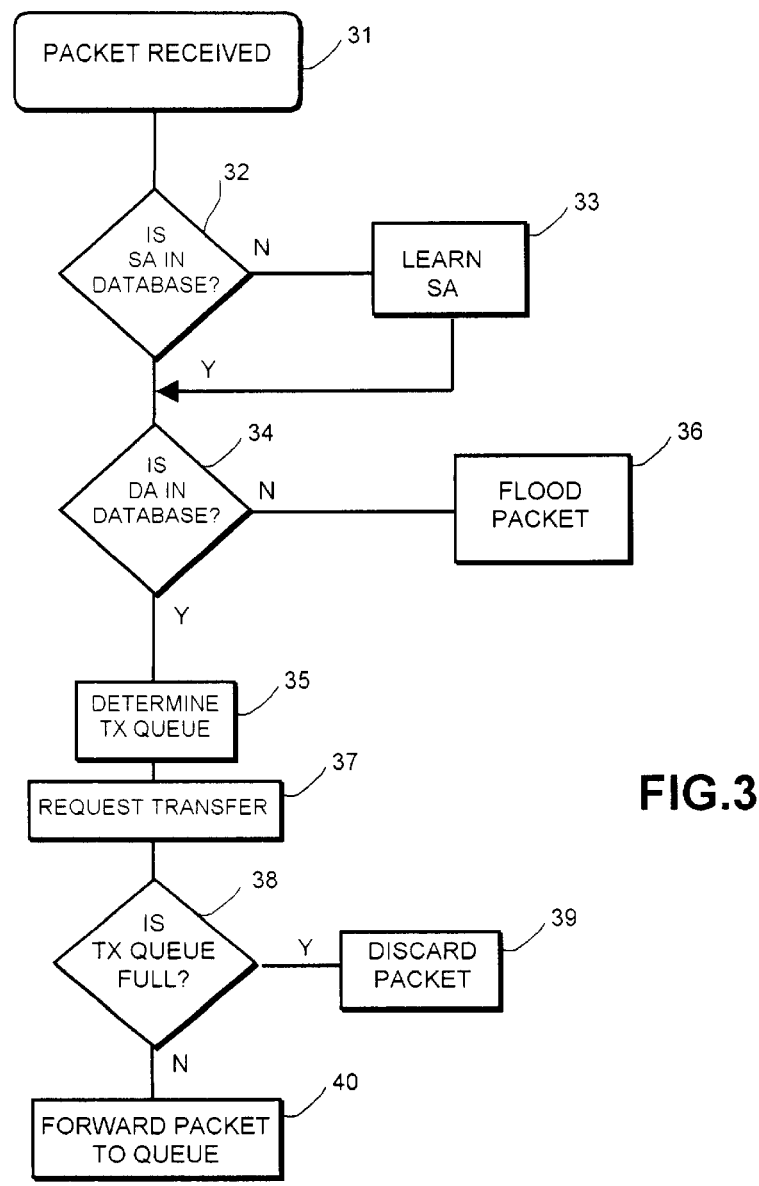
FIG. 3 illustrates a look-up and forwarding process.

FIG. 3 illustrates the look-up process for MAC addresses typical of a network switch. A packet is received, stage 30, and a look-up, performed by means of look-up engine 7 in forwarding database 9, determines whether the source address (SA) is already the subject of an entry in the database. If it is not, then the address is 'learned' (stage 33), that is to say made the subject of a table entry including an identification of the port on which the packet was received and (usually) a VLAN number. If the switch is to be used for routing (layer 3 switching) as well as bridging (layer 2 switching), an entry will typically include the protocol (IP) address of the packet.

In order to determine where the packet should be sent, a further look-up is made (stage 34) to find a match for the destination address (DA) in the database. If the address is found, the appropriate transmit queue may be determined for the port associated with that MAC address in the forwarding database.

It is not necessary for the SA and DA look-ups to be performed in the specific order shown in FIG. 3.

If it should happen that the destination MAC address is not in the forwarding database, it is normally necessary to 'flood' or 'broadcast' the packet (stage 36). By this is meant that a copy of the packet is supplied to all (or all of a selected plurality) of the ports in order to obtain an ARP (address resolution protocol) response from a device having the network address identified in the packet. That device will respond with its MAC address and enable this address to be learned in respect of the relevant port in the forwarding database.

The look-up process will normally end with a determination of the transmit queue for which the received packet is intended. This is shown by stage 35 in FIG. 3.

At some subsequent time, and more particularly when the packet reaches the head of its receive queue, the switching apparatus or software relating to the control of that queue will make a request for transfer of the packet from the receive queue to the transmit queue determined for that packet. This is shown by stage 37 of FIG. 3.

On receipt of the request for transfer, a look-up arbiter, forming part of the forwarding engine, must determine (stage 38) whether a 'full' flag for that transmit queue is 'valid' (i.e., has been asserted to denote that the respective transmit queue is above the relevant high watermark). If the 'full' flag for that transmit queue has been asserted, then the switch may, as shown in FIG. 3, cause discard of the packet (stage 39). This is not essential to the present invention, if 'head of line blocking' is not an important consideration then the request for transfer of the packet may merely be rejected or ignored so that the relevant packet remains at the head of the queue until that request for transfer, or a subsequent request in respect of the same packet, can be allowed.

If the 'full' flag is not asserted, then the packet is transferred (stage 40) from the receive queue to the transmit queue to await onward transmission from the relevant transmit port as soon as circumstances allow.

Figure 4:
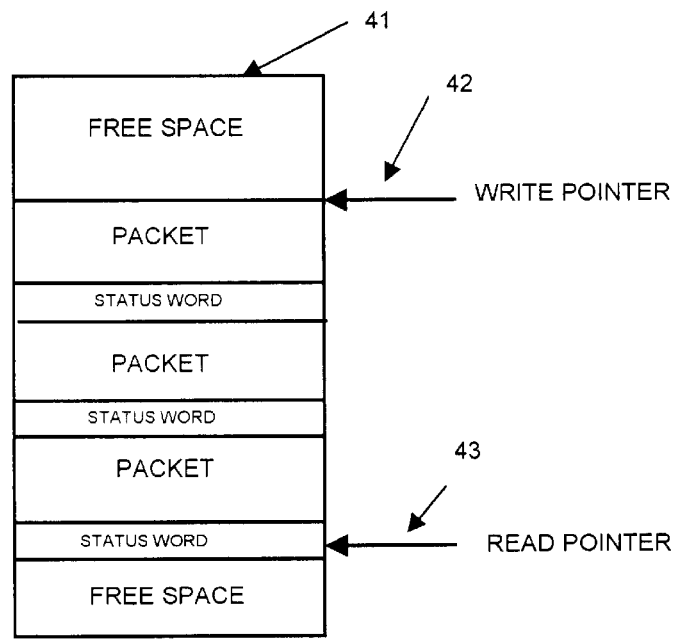
FIG. 4 illustrates one method of forming a queue of packets.
Figure 5:
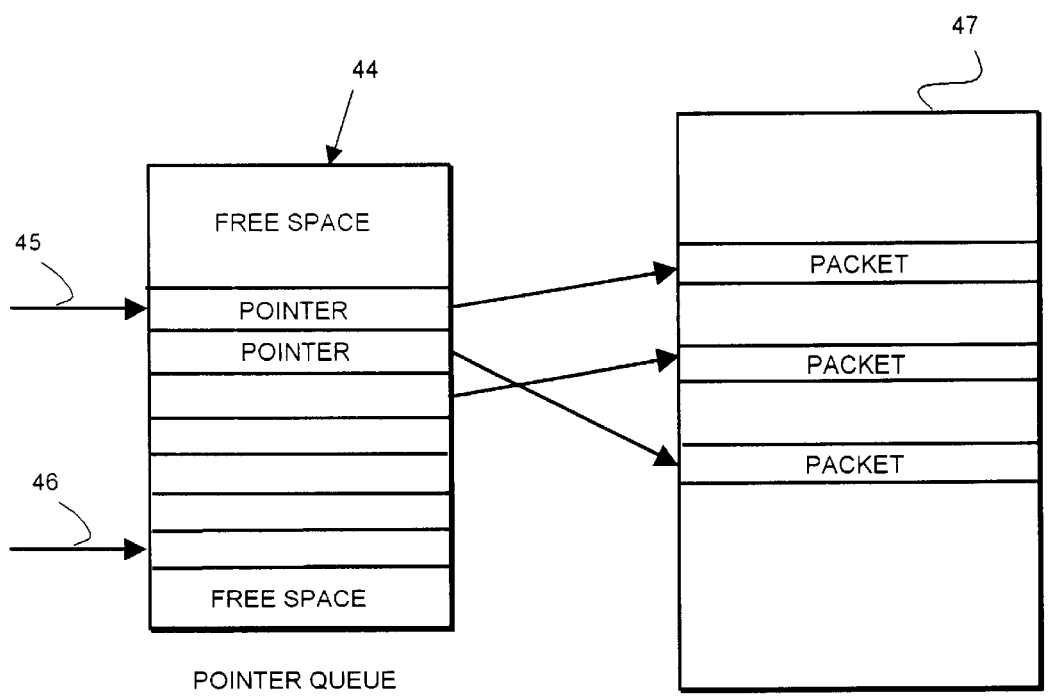
FIG. 5 illustrates a preferred method of forming a queue of packets.

FIGS. 4 and 5 illustrate different methods of forming a queue of packets. In the system shown in FIG. 4, each packet with a relevant status word is directed to a prescribed region of memory space 41 for the relevant queue, each new status word and packet being written to the queue under the control of a write pointer 42 and each packet with its status word being removed from the queue under the control of a read pointer 43. New packets and status words will be added contiguously with the queue under the control of the write pointer. It is customary for the read and write pointers to recycle through the memory space so that, for example, when the write pointer reaches the top of the memory space 41 it then reverts to the 'bottom' of the memory space.

In a system such as this the degree of fullness denoted by a watermark is determined by the effective separation of the read and write pointers. Obviously if the write pointer catches up with the read pointer the memory is full and if the read pointer catches up with the write pointer the queue is empty. In a system such as this the watermarks and the separation between a high watermark and a low watermark are functions not only of the number of packets but also their sizes.

FIG. 5 illustrates a generally preferable method of forming a traffic queue. In a system such as shown in FIG. 5, the queue is actually formed in memory space 44 as a queue of pointers. New pointers are added to the queue by means of a write pointer 45 and are removed from the queue by means of a read pointer 46. Each pointer identifies a packet and is actually a data word which points to the location of the respective packet in another part 47 of the memory.

In a system such as shown in FIG. 5, a high watermark and a low watermark may again be defined as relevant proportions of the available memory space 44 and in accordance with the separation of the pointers. Thus for example the high watermark may be indicated when the write pointer 45 has caught up with the read pointer 46 or may be indicated when the number of pointers in the queue is some predetermined proportion of the maximum number of pointers that can be accommodated within the allotted memory space 44. The low watermark may likewise be determined as some predetermined fraction of the total memory space so that the length of the queue is less than the low watermark if the number of pointers is less than that predetermined fraction of the total number of pointers that could be accommodated within the memory space.

Figure 6:
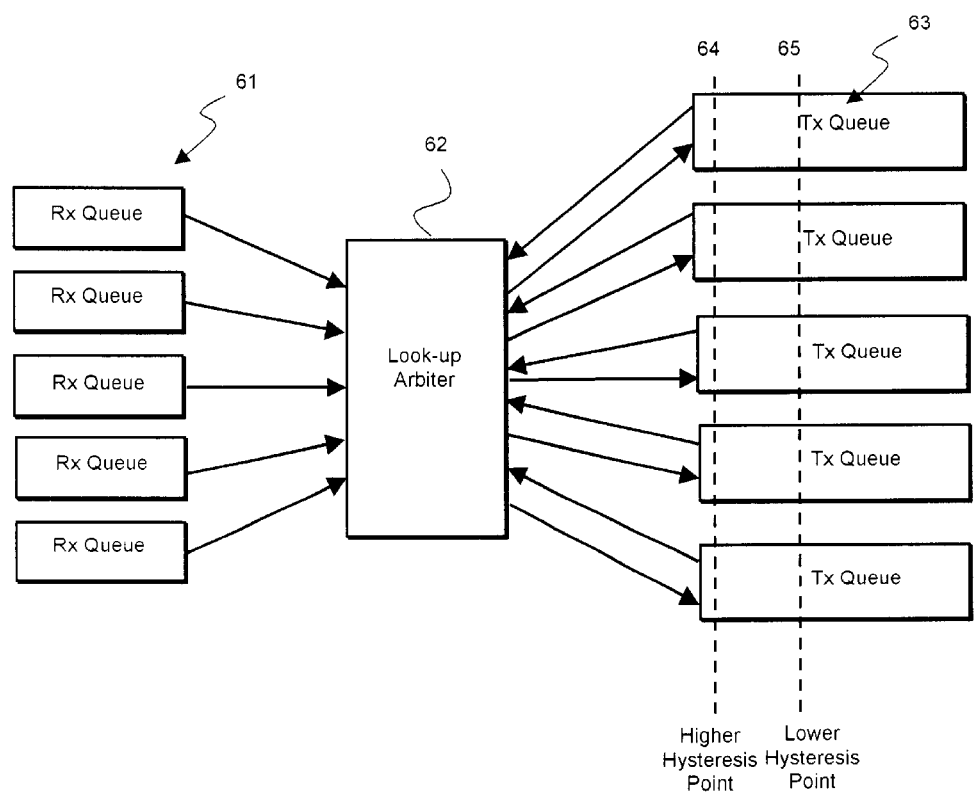
FIG. 6 illustrates a queue arbitration process.

Reference may now be made to FIG. 6 which illustrates schematically how the receive queues and the transmit queues are organised relative to a look-up arbiter. The switch includes a plurality of receive queues 61, one for each of a multiplicity of ports that can receive packets, a look-up arbiter 62, which may be in well known form per se, and a multiplicity of transmit queues 63, one for each of the ports that can forward packets from the switch.

The purpose of the look-up arbiter 62 is act on requests for transfer of packets from the receive queues to the transmit queues and more particularly to perform the stages 37 to 40 in the process shown in FIG. 3. How this is implemented in detail is not important provided that it prevents the transfer of packets from a receive queue to a specified transmit queue in response to a signal denoting that the particular transmit queue is full. Arrows from transmit queues 63 to look-up arbiter 62 denote the provision of 'transmit queue full' flags whereas the arrows from look-up arbiter 62 to transmit queues 63 indicate packet information.

In accordance with the invention, each of the transmit queues has a high watermark 64 (the higher hysteresis point) and a lower watermark 65 (the lower hysteresis point) defined for it, preferably in terms of occupancy of the relevant memory space as described with reference to either FIG. 4 or FIG. 5. In FIG. 6 the transmit queues 63 are shown as having all the same watermarks but this is not intended to be a limitation on the invention in its broadest form. The watermarks may be different for different transmit queues.

Figure 7:
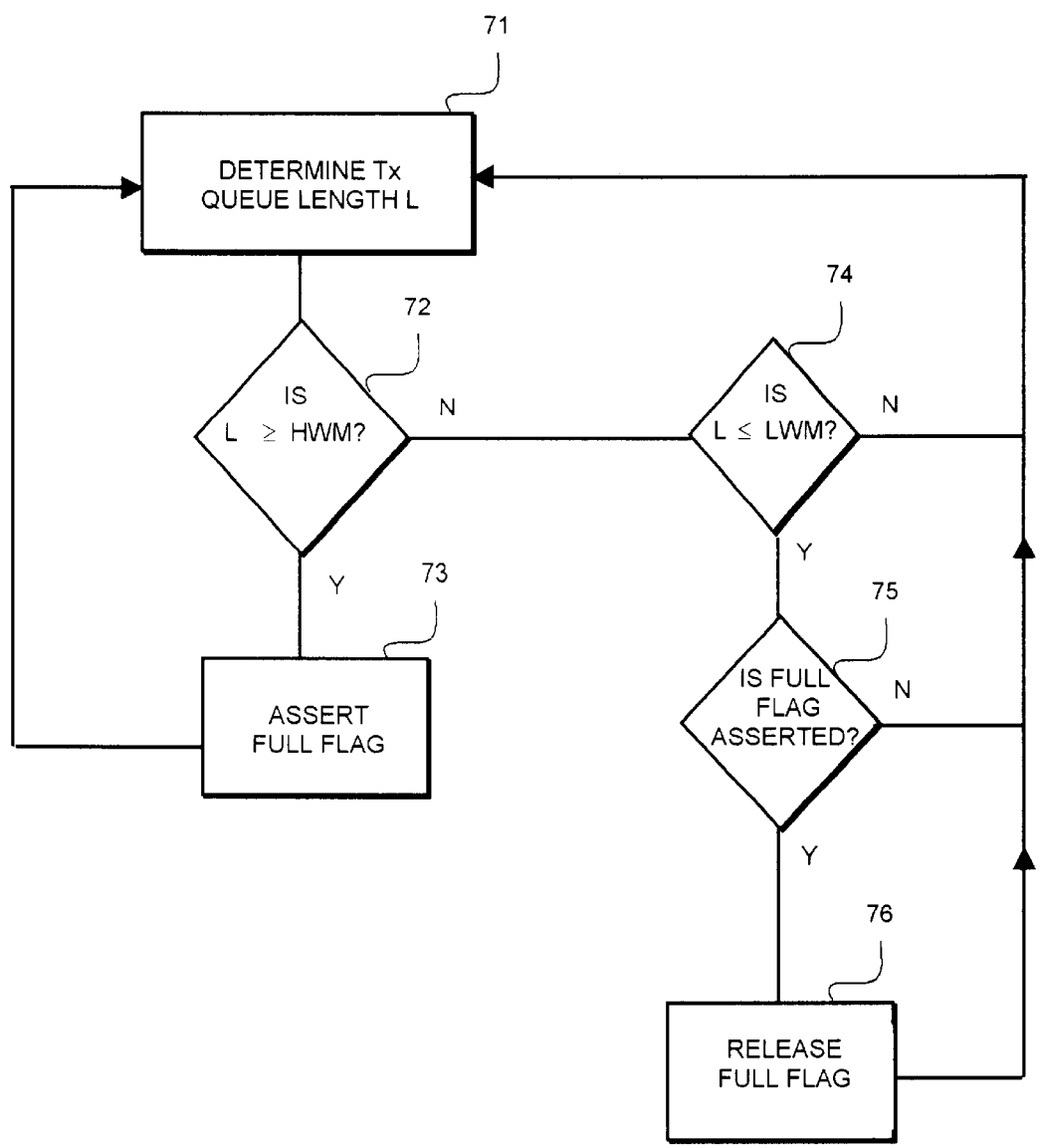
FIG. 7 is a flow diagram illustrating the operation of hysteresis on a 'full' flag in accordance with the invention.

Reference may now be made to FIG. 7 which illustrates the hysteresis applied to the 'full' flags for a transmit queue. The process of FIG. 7 may be implemented in either hardware or software according, to the organisation of the look-up arbiter 62.

The process of FIG. 7 includes a determination of the respective transmit queue length (L) for a queue. If the length (number of entries) of the queue is greater than the high watermark (stage 72) then the 'full' flag is asserted, stage 73.

The implementation of the present invention in the exemplary context is the use of the low watermark to determine when the full flag will be released or deasserted. If the length of the transmit queue is not equal to or greater than the length defined by the high watermark, then stage 74 indicates a determination whether the length is equal to or less than the low watermark. Obviously no action is required if the length is still above the low watermark and the process (or state machine implementing the process) reverts to stage 71 in the next machine cycle. If the length of the transmit queue is equal to or less than the low watermark, the look-up arbiter determines whether the full flag for that transmit queue has been asserted. If it has not been asserted, no action is required and the process or state machine reverts to stage 71. If however the full flag is asserted and the length of the transmit queue has fallen to a level equal to or less than the low watermark the full flag is released, stage 76.

As previously indicated, it is desirable for the difference between the high watermark and the low watermark to represent a multiplicity of packets and in particular to be at least as great as the number of receive queues, and hence the number of ports which may supply packets to the transmit queue

What is claimed is:

1. A multiport network device comprising:
   means for forming a multiplicity of receive queues each composed of entries representing data packets;
   means for forming a multiplicity of transmit queues each composed of entries representing data packets;
   a forwarding engine for transferring entries from said receive queues to said transmit queues;
   means for defining a respective first hysteresis point and a respective second hysteresis point for each transmit queue; and
   means for asserting an indication that any one transmit queue is greater than its respective said first hysteresis point, said forwarding engine preventing transfer of entries from any one of said receive queues to said any one transmit queue in response to the assertion of said indication;
   wherein said means for asserting is operative to deassert said indication, thereby to allow transfer of entries to said any one transmit queue, when the length of said any one transmit queue falls below its respective said second hysteresis point, the difference between said respective first and second hysteresis points comprising a multiplicity of said entries.

2. A device according to claim 1 wherein said multiplicity of entries is at least equal to the number of said receive queues.

3. A device according to claim 1 wherein said length is defined in terms of a number of pointers.

4. A device according to claim 1 and including a forwarding database containing packet addresses and a forwarding engine which determines in cooperation with said database a transmit queue for a packet in a receive queue.

5. A method of operating a multiport network device, comprising:
   forming a multiplicity of receive queues each composed of entries representing data packets;
   forming a multiplicity of transmit queues each composed of entries representing data packets;
   transferring entries from said receive queues to said transmit queues by means of a forwarding engine;
   defining a respective first hysteresis point and a respective second hysteresis point for each transmit queue;
   asserting an indication that any one transmit queue is greater than its said respective first hysteresis point, said forwarding engine preventing transfer of entries from any one of said receive queues to said any one transmit queue in response to the assertion of said indication; and
   deasserting said indication, thereby to allow transfer of entries to said any one transmit queue, when the length of said any one transmit queue falls below its said respective second hysteresis point, the difference between said respective first and second hysteresis points comprising a multiplicity of said entries.

6. A method according to claim 5 wherein said multiplicity of entries is at least equal to the number of said receive queues.

* * * * *